United States Patent
Chen

(10) Patent No.: US 10,708,125 B1
(45) Date of Patent: Jul. 7, 2020

(54) GATEWAY CONFIGURATION USING A NETWORK MANAGER

(71) Applicant: Amazon Technologies, Inc., Seattle, WA (US)

(72) Inventor: Po-Chun Chen, Oak Hill, VA (US)

(73) Assignee: Amazon Technologies, Inc., Seattle, WA (US)

(*) Notice: Subject to any disclaimer, the term of this patent is extended or adjusted under 35 U.S.C. 154(b) by 125 days.

(21) Appl. No.: 16/122,765

(22) Filed: Sep. 5, 2018

(51) Int. Cl.
| | |
|---|---|
| H04L 12/24 | (2006.01) |
| H04L 12/715 | (2013.01) |
| H04L 12/745 | (2013.01) |
| H04L 29/06 | (2006.01) |
| H04L 12/723 | (2013.01) |
| H04L 12/46 | (2006.01) |
| G06F 9/455 | (2018.01) |
| H04L 12/713 | (2013.01) |

(52) U.S. Cl.
CPC ...... *H04L 41/0803* (2013.01); *G06F 9/45558* (2013.01); *H04L 12/4641* (2013.01); *H04L 45/04* (2013.01); *H04L 45/50* (2013.01); *H04L 45/586* (2013.01); *H04L 45/748* (2013.01); *H04L 63/0272* (2013.01); *H04L 65/102* (2013.01); *G06F 2009/45595* (2013.01); *H04L 45/64* (2013.01)

(58) Field of Classification Search
CPC . H04L 41/0803; H04L 12/4641; H04L 45/50; H04L 45/586; H04L 45/748; H04L 63/0272; H04L 65/102; H04L 45/64; G06F 9/4555; G06F 2009/45595
See application file for complete search history.

(56) References Cited

U.S. PATENT DOCUMENTS

| | | | | |
|---|---|---|---|---|
| 10,250,529 | B2* | 4/2019 | Maier | H04L 49/70 |
| 2006/0209832 | A1* | 9/2006 | Keller-Tuberg | H04L 12/4641 370/392 |
| 2011/0013641 | A1* | 1/2011 | Kolhi | H04L 12/4633 370/401 |
| 2013/0054763 | A1* | 2/2013 | Van der Merwe | H04W 12/004 709/220 |
| 2015/0381493 | A1* | 12/2015 | Bansal | H04L 45/306 370/392 |

(Continued)

*Primary Examiner* — Arvin Eskandarnia
(74) *Attorney, Agent, or Firm* — Klarquist Sparkman, LLP

(57) ABSTRACT

The following description is directed to configuring gateways in computer networks. For example, a system includes a first configurable network programmed with a first set of network addresses and a second configurable network programmed with a second set of network addresses. The system includes a private gateway connecting the first configurable network and the second configurable network to a client private network. The system includes a server computer configured to generate routing information for the private gateway. The routing information can restrict the network addresses that are reachable from the client private network to non-overlapping network address spaces within each of the first configurable network and the second configurable network. The server computer is configured to use the generated routing information to configure the private gateway for forwarding network packets among the client private network, the first configurable network, and the second configurable network.

20 Claims, 7 Drawing Sheets

(56) References Cited

U.S. PATENT DOCUMENTS

2017/0346689 A1\* 11/2017 Miller .................. H04L 41/0816
2019/0104035 A1\* 4/2019 Cidon ................... H04L 45/586
2019/0104050 A1\* 4/2019 Cidon ..................... H04L 45/74

\* cited by examiner

GATEWAY CONFIGURATION USING A NETWORK MANAGER

BACKGROUND

Cloud computing is the use of computing resources (hardware and software) which are available in a remote location and accessible over a network, such as the Internet. A cloud service provider (also referred to as a compute service provider) can provide a set of computing resources (including storage, networking, and computing resources) for its users to use. Users are able to consume these computing resources on demand. Cloud computing entrusts remote services with a user's data, software, and/or computation. Use of virtual computing resources can provide a number of advantages including cost advantages and/or ability to adapt rapidly to changing computing resource needs. In addition to the virtual computing resources provided by the compute service provider, a user can also have computing resources at the user's premises. The user may desire to have the computing resources at the user's premises and the computing resources at the compute service provider's premises communicate with each other. For example, the user can use both the virtual resources and their own resources to solve a particular computational problem. However, sharing resources across multiple entities and/or physical sites can potentially raise compatibility, connectivity, and/or security concerns.

DETAILED DESCRIPTION

Overview

Figure 1:
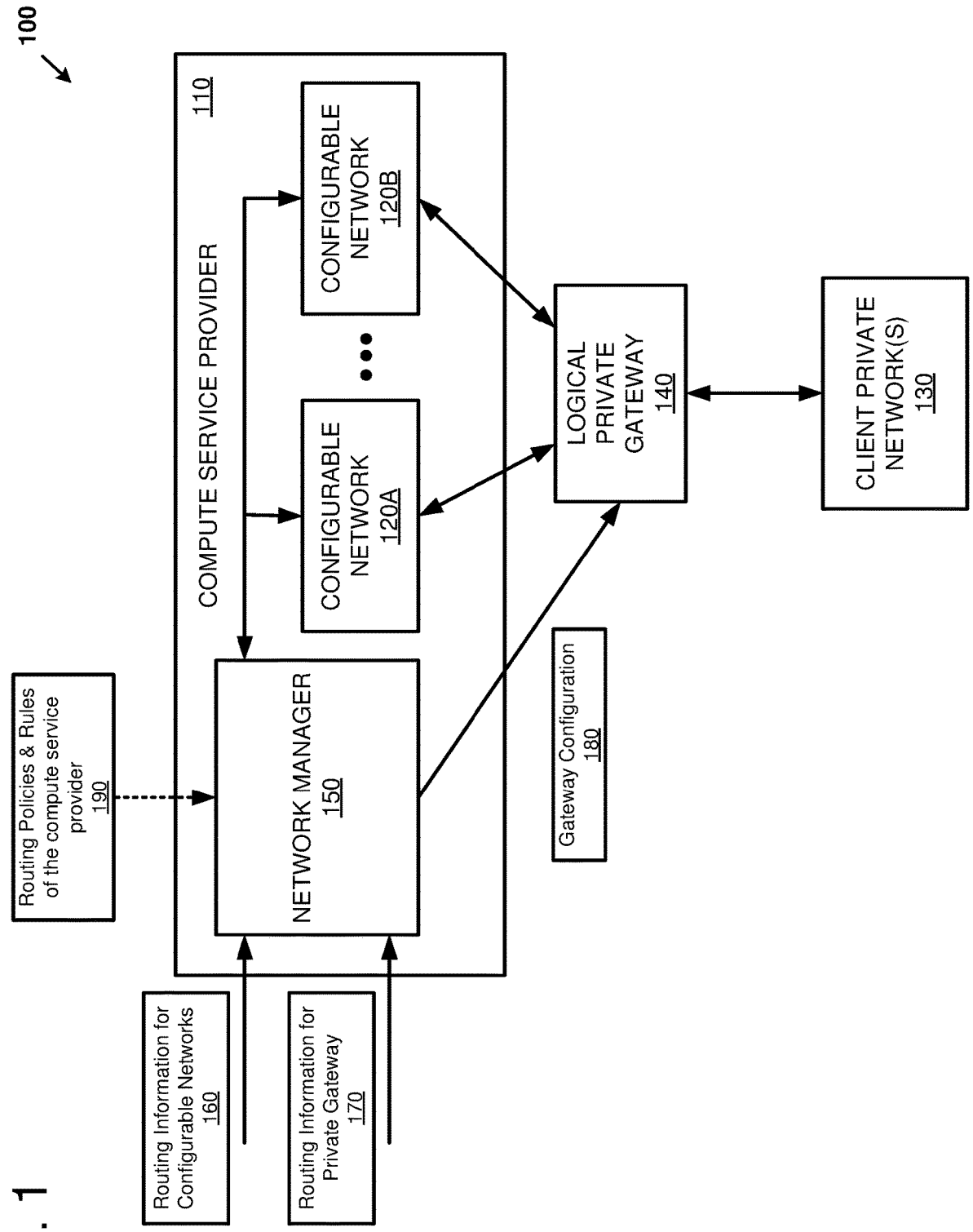
FIG. 1 is a system diagram showing an example of a system for accessing multiple configurable networks from a client private network via a logical private gateway.

A corporate, educational, or other type of entity can use a variety of different computer systems to solve a variety of different problems for the entity. As one example, the entity may own computing resources at one or more geographic sites of the entity and the entity may use computing resources that are provided by a compute service provider at a datacenter controlled by the compute service provider. Thus, the entity can be a customer of the compute service provider. Enabling the computing resources at the customer site(s) to communicate with the computing resources of the compute service provider can enable information to be shared and problems to be divided between the different computing resources. The entity can be divided into semi-autonomous sub-entities, such as divisions, departments, or groups. The different sub-entities can have different policies and accessibility of the compute resources. For example, an information technology (IT) department can have greater access and control of the computing resources across the organization and at the compute service provider, while a finance department can have more limited access and control of the computing resources. By allowing the different sub-entities to provision and configure the compute resources independently of other sub-entities, each sub-entity can potentially increase its efficiency. However, when the compute resources configured by one sub-entity communicate with the compute resources configured by a different sub-entity, potential compatibility issues can arise.

For example, when two different networks (e.g., virtual private networks (VPN) or virtual private cloud (VPC)) have been configured independently of one another, each of the networks can use a range of network addresses, and the addresses of the different networks can overlap with each other. If the two networks with the overlapping addresses are simply connected together there will be an address conflict where a network device from each network is assigned to the same address. Having overlapping addresses is likely to cause erroneous operation of the network and its devices. Thus, it can be a good practice to use different address ranges for different networks that are to be connected together.

It should be noted that network addresses are used to identify nodes within a network, where a particular network device can include one or more nodes. A given node can have one or more network addresses. For example, a different network address can be provided for each layer of abstraction of a network, where the layers are defined by the Open Systems Interconnection (OSI) model. The OSI model standardizes and partitions the internal functions of a communication system into abstraction layers. In particular, the OSI model standardizes and partitions a communication system into seven layers. A particular layer provides a communication path with the layers adjacent (e.g., a layer above and a layer below) to the particular layer. The lowest layer is the physical layer (referred to as layer 1) which defines the electrical and physical specifications for communication over a physical transmission medium. Specifically, the physical layer can define voltage levels, signal timing, transmission media (e.g., electrical cables, fiber-optic cables, radio frequencies), and so forth. The physical layer can provide a communication path with the data link layer or link layer (referred to as layer 2). The link layer defines the protocols for transferring data between two nodes. Additionally, the link layer can define protocols for establishing and terminating connections between nodes, managing flow control, and detecting and/or correcting errors occurring on the physical layer. Examples of link layer protocols are Ethernet, Asynchronous Transfer Mode (ATM), Point-to-Point Protocol (PPP), High-level Data Link Control (HDLC), Fiber Distributed Data Interface (FDDI), and Token Ring. The link layer can provide a communication path with the network layer (referred to as layer 3). Examples of network layer protocols are Internet Protocol (IP) (including IPv4 and IPv6), ICMP, Address Resolution Protocol (ARP), Internetwork Packet Exchange (IPX), and Datagram Delivery Protocol (DDP). Other layers of the OSI model include the transport layer (layer 4), the session layer (layer 5), the presentation layer (layer 6), and the application layer (layer 7). It should be noted that a network packet (or simply a packet) generally includes a header used to address the packet to a remote node or agent at the layer of the packet and a payload having a discrete quantity of information. A packet addressing an agent at one layer can be encapsulated within a payload of a packet at a lower layer as the original packet transits the communication layers. A packet of the link layer can also be referred to as a frame. The OSI model is a reference and some networking protocols may not strictly adhere to the seven layers of the OSI model. For example, in some embodiments, the functions of the link layer and the physical layer may be blended into a single link layer. The combination of protocols used at the different layers of the OSI model can be referred to as a protocol stack. For example, one particular protocol stack may include an IP layer and an Ethernet layer. A node using the IP/Ethernet protocol stack can have an IP address and an Ethernet address.

Generally, two different versions of IP addresses are used in production networks, IP version four (IPv4) and IP version six (IPv6). IPv4 addresses can be represented by a 32-bit number which can be written as four eight-bit decimal numbers separated by periods (e.g., 192.0.0.0). A range of IP addresses (also referred to as a subnet or a CIDR block) can be represented using Classless Inter-Domain Routing (CIDR) notation. The CIDR notation includes a routing prefix and a subnet mask. Specifically, a range of IP addresses written in CIDR notation includes an IP address followed by a "I" character and a number representing a length of the routing prefix. The routing prefix includes the most significant bits of the addresses within the address range. For example, the CIDR notation, "128.96.128.0/24" refers to a range of IPv4 addresses with a routing prefix of 24 address bits, so that the addresses between 128.96.128.0 and 128.96.128.255 are within the address range. The subnet mask specifies how many bits are in the least significant bits of the CIDR block. The number of bits are the number of bits of the address subtracted from the number of bits of the routing prefix. Thus, the subnet mask for the "128.96.128.0/24" CIDR block is eight bits. CIDR blocks can also be used to specify IPv6 subnets.

A network gateway (also referred to as a gateway) can be used to connect different networks together. A private gateway can be used to connect different private networks together. The gateway can include one or more network devices. The gateway is connected to the different networks that are to be connected together, and packets can be transmitted from one of the networks through the gateway to another network. When the different networks are connected together, overlapping CIDR blocks should not be visible within a given network. For example, a distinct network space can be allocated for each network to ensure that each network only announces non-overlapping CIDR blocks to the other networks that are connected via the gateway. In one solution, the different networks can be connected together via a gateway that filters route advertisements from the respective networks by configuring a prefix list (e.g., a list of CIDR blocks) on the route import policy for each network.

However, filtering the route advertisements can consume incremental resources on the gateway as the number and the size of the networks grow, such that filtering may not scale as the number of networks grow. Specifically, the gateway can include a different Virtual Routing and Forwarding (VRF) instance for each network that communicates with the gateway. A VRF instance can include information for forwarding a packet from one network or network device to another network or network device. Specifically, a VRF instance can include a routing table (e.g., a forwarding information base (FIB)) that provides a full or partial path for forwarding a packet from one interface on the gateway to another interface on the gateway. A given customer may have many networks connected to each other so that many VRF instances are instantiated for the given customer. Additionally, a gateway of a compute service provider may support hundreds or thousands of customers and so there can potentially be thousands of VRF instances on a given gateway. The route advertisements can be received on the data plane of the network device and processing (e.g., the filtering) of the route advertisements can be performed by a control plane of the gateway. The control plane of the gateway may have limited computational power and limited communication bandwidth with the data plane of the gateway, and so filtering route advertisements from many different customers can potentially overwhelm the capabilities of the control plane when the number of VRF instances exceed a relatively low threshold. Thus, filtering route advertisements on a gateway may not be scalable as the number of customers and VRF instances grow.

As described herein, a network manager of a compute service provider can be used to potentially increase the number of networks that can be connected together using a gateway. In other words, the network manager of the compute service provider can potentially increase the scalability of connecting different networks together. As one example, the network manager can include software executed on one or more server computers (e.g., a distributed fleet of Linux hosts) in communication with the network devices. A customer of the compute service provider can provide a request to the network manager to connect two or more networks together in the network manager. The network manager can generate configuration information to configure or program the network device(s) to connect the networks. The configuration information of a network device is a set of states that describes how the network device operates. For example, the configuration information can include addressing information, routing information, access control lists, access credentials, address translations, quality of service parameters, statistical gathering capabilities, protocol support, timer values, encryption parameters, device-specific tuning parameters, and/or any other information suitable for controlling and/or monitoring how the network device operates. Network devices can include switches (multilayer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, and wireless access points, for example. When the network device is updated or configured with the configuration information, the network device will operate according to the network device configuration.

The network manager of the compute service provider can control which networks can communicate with each other, and which addresses within each network are accessible from another network. The networks to connect can be located at one or more datacenters of the compute service provider and/or at one or more customer sites. For example, the networks to connect can be a customer-configurable network (also referred to as a virtual private cloud) of the compute service provider and a customer premises network that is located at a customer site. A configurable network is a network that can be specified by a customer of the compute service provider. For example, the customer can specify a topology or architecture of the configurable network, a range of addresses used within the configurable network, policies for routing packets within the configurable network, and so forth. The network manager can use rules and policies of the compute service provider and/or customer-specified requests to determine which networks are connected together and which addresses within a respective network are accessible from outside of the respective network. Generally, rules and policies of the network can specify how packets are forwarded across a network and which users are authorized to access networks and/or services. For example, the rules and polices can specify which clients have access to (e.g., a whitelist) or are denied access to (e.g., a blacklist) a network or service, a quality of service to provide for a particular type of packet, and so forth. There can be overlap between rules and policies, but generally, policies can specify higher-level controls and rules can specify lower-level controls (e.g., rules can be used to implement higher-level policies). For example, a policy can specify that customer networks at different geographic locations cannot be connected together. A rule implementing the policy can restrict packets from a subnet or an IP address associated with one geographic location from being forwarded to a subnet or an IP address associated with a different geographic location. Another policy can specify that the different configurable networks of the compute service provider cannot be connected together. Another policy can specify that the networks controlled by different customers cannot be connected together unless authorized by the affected customers. Thus, customer data can be secure even when networks of different customers are connected together using the same underlying physical hardware.

As a specific example, the network manager can receive a request to connect two or more networks. The request can include a list of the CIDR blocks used within each of the networks to connect. The network manager can receive a list of CIDR blocks that are requested to be shared between the networks. The network manager can compare the list of the CIDR blocks to be shared to the list of the CIDR blocks used within each of the networks and can generate configuration data to program the gateway connecting the networks. Generating the configuration data can include detecting conflicts (e.g., overlapping network addresses) between the CIDR blocks of different networks. The network manager can provide guardrails to protect the networks by preventing overlapping addresses to be used in networks that are connected to each other. Generating the configuration data can include calculating a longest prefix match (LPM) for the list of shareable CIDR blocks to filter out longer prefixes that may be encompassed within a shorter prefix that encompasses the longer prefix. In other words, the network manager can combine CIDR blocks of a given network so that processing for the LPM calculation during packet forwarding is reduced as compared to using unoptimized CIDR blocks. Additionally, generating the configuration data can include modifying, deleting, and/or filtering CIDR blocks to be shared between the networks. As one example, the size of a prefix can be changed to meet a minimum or maximum size prefix size (e.g., a /24 CIDR block can be changed to a /16 CIDR block) supported by the gateway and/or the networks. Thus, in response to the request, the network manager can generate a list of nonoverlapping CIDR blocks that can be used when forwarding packets between networks that are connected using the gateway. The list of nonoverlapping CIDR blocks can be in a reduced form (due to performing the LPM calculation when the CIDR blocks are being generated) so that a packet will match only one CIDR block when transiting the gateway.

The network manager can generate configuration data for the network devices of the gateway and can program the network devices of the gateway using the configuration data. For example, the network manager can generate and instantiate VRF instances for the interfaces of the gateway. After the VRF instances are instantiated on the network devices of the gateway, the enabled CIDR blocks of the neighboring networks can be announced into the respective networks so that the addresses of the neighbor networks are visible. In one embodiment, one or more interfaces of the gateway can be part of or connected to an edge device of the compute service provider, and additional interfaces of the gateway can be part of or connected to an edge device of the customer. As a specific example, a co-location center can include equipment controlled by the compute service provider and the customer. Specifically, the co-location center can include an edge-router controlled by the compute service provider and an edge router controlled by the customer. The different edge routers can be connected within the co-location center to form a connection between the compute service provider and the customer. In this manner, a private connection can be formed between the compute service provider and the customer so that the customer can have a direct path to the compute service provider.

In summary, a customer network can be connected to one or more customer-configurable networks of a compute service provider via a gateway that is connected to the compute service provider using a private network. A server computer executing network manager software can be used to configure network devices of the gateway. For example, the network manager can generate a non-overlapping list of address prefixes (e.g., CIDR blocks) that can be used to connect the customer network to the customer-configurable networks. The customer can control the addresses used within the individual customer-configurable networks and the network manager can provide guardrails to prevent overlapping addresses from being announced into the customer network. Configuring the gateway can include programming virtual routing and forwarding (VRF) instances on network device(s) of the gateway. The network manager can reduce a number of address prefixes to configure (by performing LPM calculations) which can decrease the load of the gateway routers when forwarding packets. In this manner, the network manager can provide protection for the individual networks when the networks are connected (e.g., overlapping addresses can be prevented). Using a network manager can move the resource-consuming operations of generating configuration data, such as a routing table, and performing LPM from the control plane of the gateway device(s) to an external computing host (e.g., the network manager). By reducing the resource utilization on the network devices, the number of customers and/or networks that can be connected together under control of the compute service provider can be increased.

Example Architectures for Configuring a Gateway Using a Network Manager

Figure 2:
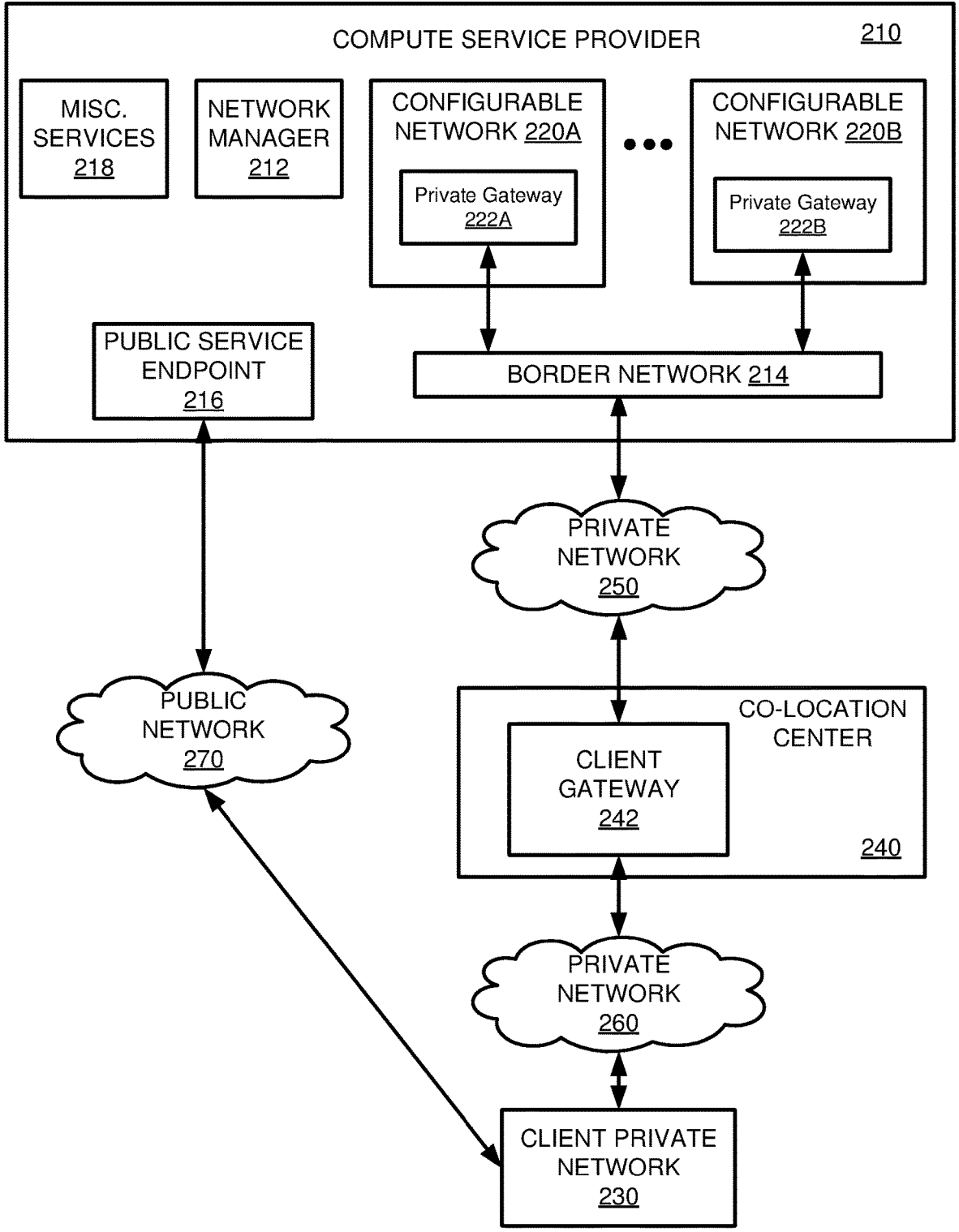
FIG. 2 illustrates another example of a system for accessing multiple configurable networks from a client private network.
Figure 3:
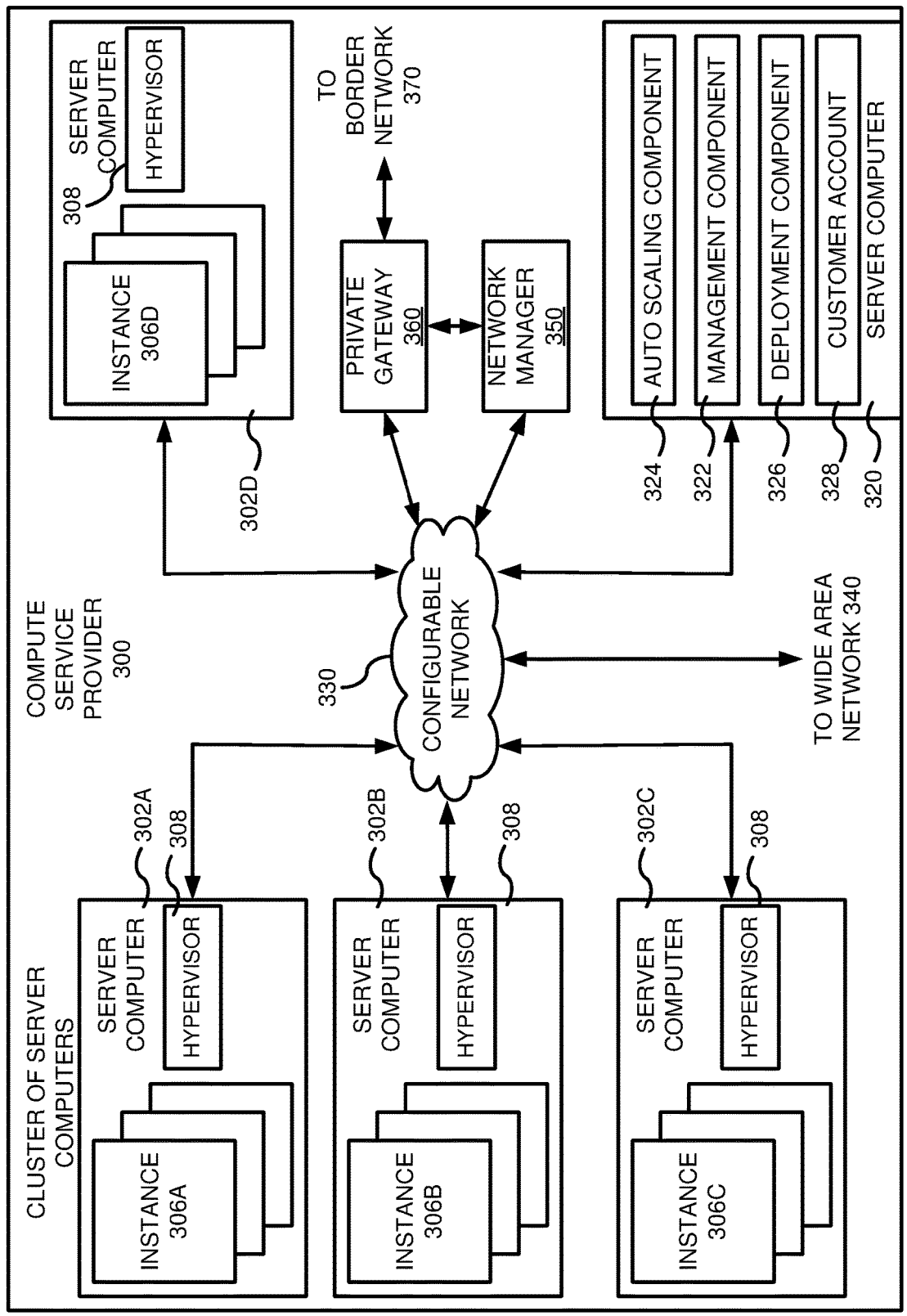
FIG. 3 is a system diagram showing an example of a plurality of virtual machine instances running in a multi-tenant environment including a network manager and a private gateway.
Figure 4:
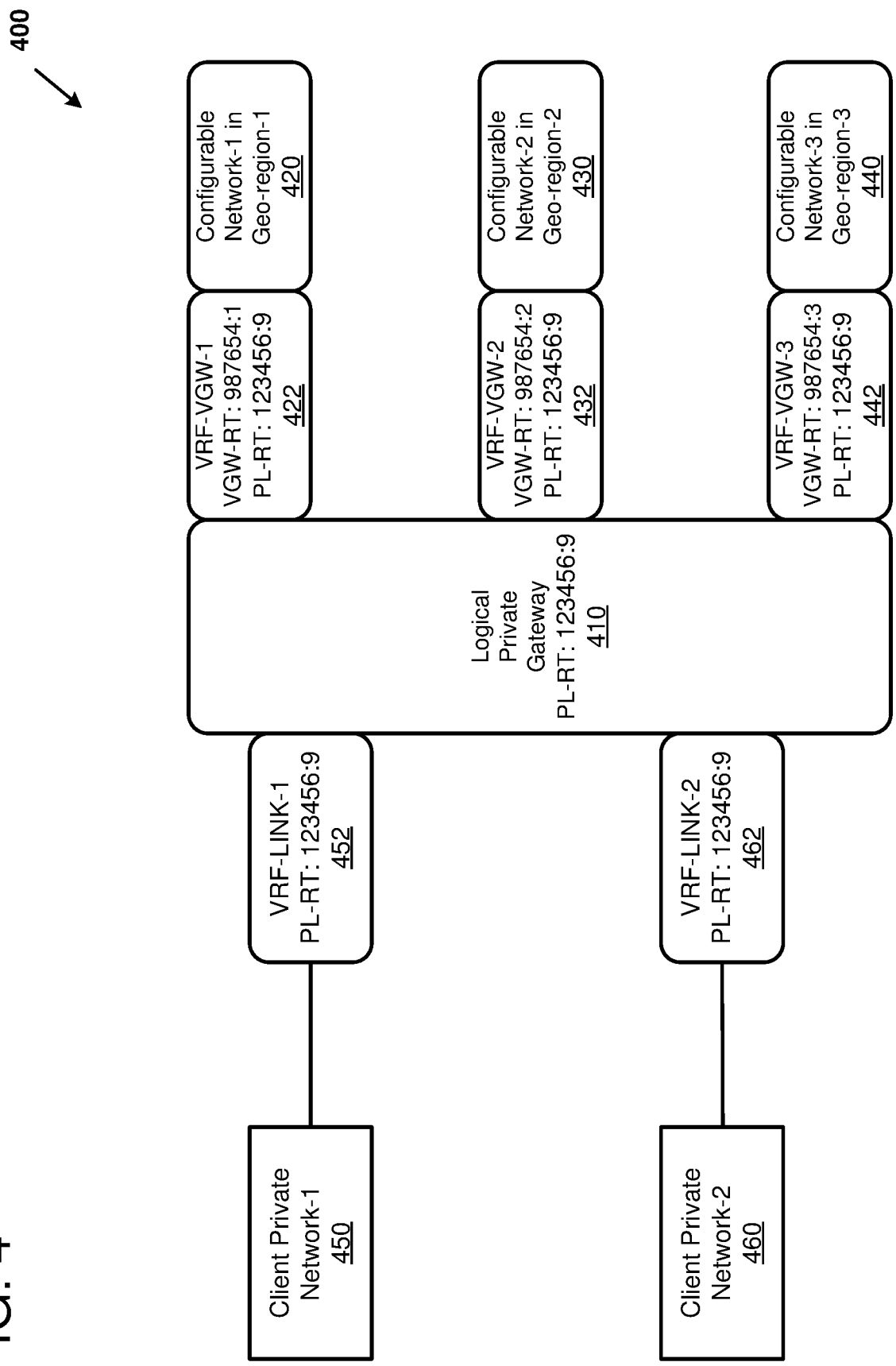
FIG. 4 illustrates an example of a configured private gateway for providing a communication path between multiple distributed networks.
Figure 5:
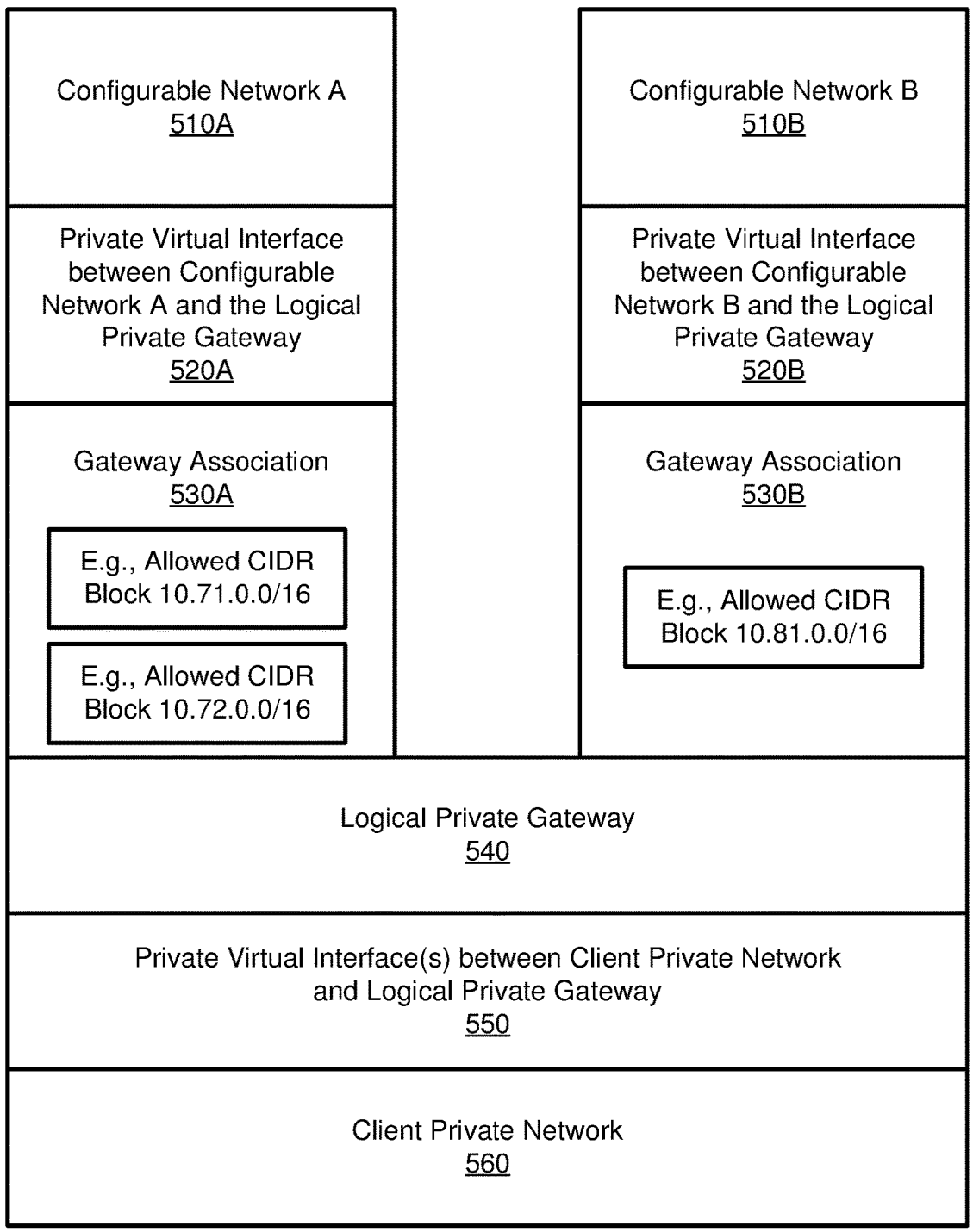
FIG. 5 illustrates an example of a logical model for allocating resources among a group of local networks.

FIGS. 1-5 illustrate various aspects of an architecture for configuring a gateway using a network manager. FIG. 1 is a system diagram showing an example of a system for accessing multiple configurable networks from a client private network (e.g., a customer network) via a logical private gateway. FIG. 2 illustrates another example of a system for accessing multiple configurable networks from a client private network. FIG. 3 is a system diagram of a multi-tenant environment. A customer-configurable network can be used to connect a plurality of virtual machine instances running in the multi-tenant environment. The multi-tenant environment can include a network manager and a private gateway. FIG. 4 illustrates an example of a configured private gateway for providing a communication path between multiple distributed networks. FIG. 5 illustrates an example of a logical model for allocating resources among a group of local networks.

FIG. 1 is a system diagram showing an example of a system 100 for accessing multiple configurable networks (120A-B) of a compute service provider 110 from a client private network (e.g., a customer network) 130 via a logical private gateway 140. The compute service provider 110 can provide a set of computing resources (including storage, networking, and computing resources) for its customers to use. Specifically, the compute service provider 110 can include a network manager 150 and one or more configurable networks 120A-B (also referred to as 120).

The configurable networks 120 are configurable by a customer of the compute service provider 110 within constraints specified by the compute service provider 110. For example, a customer can configure one or more aspects of the configurable network 120, such as: ranges of network addresses (e.g., CIDR blocks) to be used for assigning to computing nodes of the compute service provider 110, a network topology of the configurable network 120, policies for forwarding packets within the configurable network 120, and so forth. The ranges of network addresses can include public addresses that are accessible over a public network (such as the Internet) and private addresses that are accessible within the configurable network 120 and/or by networks that are connected to the configurable network 120. For example, the ranges of network addresses can be used as an extension of the addresses accessible to the client private network 130. The configurable networks 120 can be logical networks (such as a virtual large area network (VLAN)) that are configured on a physical infrastructure comprising network devices. The network devices can be interconnected to form a communication fabric between the various nodes of the compute service provider 110. For example, the network devices can include switches, routers, bridges, and so forth.

The customer can configure the configurable networks 120 using the network manager 150 or another service of the compute service provider 110. The network manager 150 can include software, hardware, or combinations thereof. For example, the network manager 150 can include a fleet of server computers executing network manager software. The network manager 150 can include a network-accessible service, such as a web-service, that can receive an API request to configure the configurable networks 120. A web service is a software function provided at a network address over a network, such as the Internet (possibly, but not necessarily, using the World Wide Web). Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request interfaces, along with a definition of the structure of the messages used to invoke the API and the response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request. Additionally or alternatively, the web service can perform actions in response to the API request without generating a response to the endpoint identified in the request. In particular, an API request originated by a customer or user of the compute services provider can include structured or unstructured fields for specifying a range of network addresses that are to be used within a given configurable network 120, a range of network addresses within a given configurable network 120 to be shared with the client private network 130, and a range of network addresses within the client private network 130 to be shared with a given configurable network 120, for example.

The network manager 150 can provide an interactive interface to users of the compute service provider 110. For example, the network manager 150 can present a graphical user interface (GUI) or other user interface when a client device accesses the network manager 150 at a given uniform resource locator (URL) or other network address. The user interface can include a console window which allows the user to interact with the network manager 150. For example, the console window can provide a command line interface, a text entry box, a graphical menu, or other interface to the user. The user can access the console window using a client device and the user can specify the range of network addresses that are to be used within a given configurable network 120. Additional inputs that the user can provide to the network manager 150 can include: an identifier for a given configurable network 120, a customer identifier associated with a configurable network 120, a range of network addresses within a given configurable network 120 to be shared with the client private network 130, a range of network addresses to stop sharing with the client private network 130, an identifier for the client private network 130, a customer identifier associated with a client private network 130, a range of network addresses within the client private network 130 to be shared with a given configurable network 120, a range of network addresses to stop sharing with a given configurable network 120, an identifier for the logical private gateway 140, and so forth.

Thus, the network manager 150 can use configuration information supplied by the customer via an API request or a request via a console to generate gateway configuration information 180 for configuring the logical private gateway 140. The logical private gateway 140 can include one or more network devices. For example, the logical private gateway 140 can include an edge router (not shown) linking the compute service provider 110 to a backbone network (not shown), the backbone network, and an edge router (not shown) linking the backbone network to the client private network 130. The logical private gateway 140 can include a virtual interface (not shown) to each of the networks connected to the logical private gateway 140. For example, there can be a different virtual interface for each of the configurable network 120A, the configurable network 120B, and the client private network 130. The gateway configuration information 180 can be used to program the virtual interfaces and to provide other configuration information to the logical private gateway 140.

The network manager 150 can generate the gateway configuration information 180 using routing information 160 for the configurable networks 120 and routing information 170 for the private gateway 140. For example, the routing information 160 can include a complete list of all routing prefixes (e.g., CIDR blocks) used within each of the configurable networks 120A and 120B. The routing information 170 can include a list of networks that can communicate with each other and a complete list of all routing prefixes that are specified to be shared between the respective configurable networks 120A-B and/or the client private networks 130. The routing information 170 can include a list of networks that are associated with or connected to the logical private gateway 140. The routing information 170 can include a list of the routing prefixes that can transit the logical private gateway 140 for a given network. Additionally, the network manager 150 can use routing policies and rules 190 of the compute service provider 110 to generate the gateway configuration information 180. The routing policies and rules 190 can include rules for determining which networks can forward packets to each other, rules for determining which customers can access particular networks, ranges of legal addresses for a given network, and so forth. As a specific example, the rules 190 can prevent packets from being forwarded between the different configurable networks 120A-B to each other via the logical private gateway 140. The rules 190 can prevent packets from being forwarded, via the logical private gateway 140, between different customer sites at different geographical locations. The rules 190 can associate a customer or user with a network so that the network manager 150 can control which customers can access which configurable networks. Thus, the rules can potentially prevent unauthorized access of the configurable networks.

The network manager 150 can analyze the routing information 160, the routing information 170, and the routing policies and rules 190 to safeguard the operation of the configurable networks 120 and the client private networks 130. For example, the network manager 150 can enforce that there are no overlapping network addresses that are accessible by any given network. A given network can include public network addresses, private network addresses, and shared network addresses. Public network addresses can be represented by a globally unique address so that the address can be accessible over a public network, such as the Internet. The public network address can be accessible over a gateway (not shown) to the public network and may also be accessible using the logical private gateway 140. Private network addresses are accessible only within a given network. Shared network addresses can be accessible by a remote network via the logical private gateway 140. The network manager 150 can reject any requested routes through the logical private gateway 140 that create overlapping network addresses within a group of neighbor networks. Additionally, the network manager 150 can reject any requested routes to a network that is not authorized for the requester to access. Thus, the routing information generated by the network manager 150 can restrict the network addresses that are reachable from the client private network 130 to non-overlapping network address spaces within each of the configurable network 120A and the configurable network 120B.

The network manager 150 can use the generated routing information to configure the logical private gateway 140 for routing network packets between the client private network(s) 130 and the configurable network 120A and between the client private network(s) 130 and the configurable network 120B. Configuring the logical private gateway 140 can include executing one or more scripts to remotely login (over a public or private network) to network devices of the logical private gateway 140 and to program the network devices to forward packets through the logical private gateway 140 according to the generated routing information. Configuring the logical private gateway 140 can include coordinating the configuration of the individual network devices (e.g., sequencing the configuration of the individual network devices) so that the network devices of the logical private gateway 140 maintain consistent state according to the generated routing information. Configuring the logical private gateway 140 can include starting an update or initialization sequence of a routing protocol, such as by sending a BGP update packet, for example.

As a result of configuring the logical private gateway 140 with the gateway configuration information 180, the client private network 130 can communicate with multiple configurable networks 120 of the compute service provider 110 using a single logical private gateway 140. As a specific example, one or more customers or users of the compute service provider 110 can specify how to configure each of the configurable networks 120A and 120B. The user(s) may access the configurable networks 120A and 120B over a public gateway (not shown) of the compute service provider 110 or a private gateway (not shown) that connects a single configurable network 120 to the client private network 130. The user(s) can define a first range of addresses that are used for the configurable network 120A and a second range of addresses that are used for the configurable network 120B. The configurable networks 120A and 120B can be specified using the routing information 160. As one example, the different users can be different departments within an organization, such as an accounting department and an engineering department. Initially, the different users may configure the configurable networks 120A and 120B without coordination. At a later time, the organization can decide to make the configurable networks 120A and 120B an extension of the client private network 130. For example, an IT department of the organization can determine which configurable networks 120 to connect to the logical private gateway 140, and which addresses within the respective configurable networks 120 can be accessible via the logical private gateway 140. This information can be specified using the routing information 170. The network manager 150 can verify that the requested configuration for the logical private gateway 140 is compatible with routing rules and policies of the compute service provider 190. If the requested configuration is compatible, the network manager 150 can program the network devices of the logical private gateway 140 so that packets can be forwarded between the configurable network 120A and the client private network 130, and between the configurable network 120B and the client private network 130.

FIG. 2 illustrates another example of a system 200 for accessing multiple configurable networks 220A-B of a compute service provider 210 from a client private network 230. The client private network 230 can be located at a customer premises, for example. The different configurable networks 220 can be located in different geographic regions. For example, each of the configurable networks 220 can have an independent power supply, independent routing resources, and so forth. Thus, the different configurable networks 220 can provide high availability, fail-over, and redundancy for a customer of the compute service provider 210. The network manager 212 can be used to configure the configurable networks 220, to determine which configurable networks 220 are accessible from the client private network 230, and to determine which addresses within the respective configurable networks 220 are private, public, or shareable. The network manager 212 can also be used to program network devices between the configurable networks 220 and a co-location center 240.

The co-location center 240 can include equipment (e.g., network devices) that is controlled by both the compute service provider 210 and one or more customers of the compute service provider 210 (e.g., the owner of the client private network 230). The co-location center 240 can include equipment of multiple customers of the compute service provider 210. For example, traffic from multiple various customers can be routed from the compute service provider 210 over the private network 252 the co-location center 240. Traffic for a particular customer can be routed from the co-location center 240 to the client private network 230 using one or more private networks, such as the private network 260, where different customers can use different respective private networks. Thus, there can be different private networks for each customer. While not shown, there can be different co-location centers located at different geographic regions, and each of the different geographic regions can be connected to the border network 214 via the private network 250 or another network. Thus, a given customer of the compute service provider 210 can connect to the configurable networks 220 from different geographic regions to support multiple sites of the customer and to provide redundancy for higher availability systems.

Network packets can transit multiple logical devices between the configurable networks 220 and the co-location center 240. As one example, packets can be forwarded within the configurable network 220 using virtual large area network (VLAN) technology. For example, the packets can include an IEEE 802.1Q header that includes a tag identifying the configurable network associated with the packet. The configurable network 220 can include a private gateway 222 that controls which packets can egress and/or ingress the configurable network 220. The private gateway 222 can be connected to a border network 214 which is connected to the private network 250 which is connected to a client gateway 242 of the co-location center 240. Thus, a network packet from the configurable network 220A to the client private network 230 can flow through the configurable network 220A, the private gateway 222A, the border network 214, the private network 250, the client gateway 242, the private network 260, and the client private network 230. In one embodiment, the border network 214 and the private network 250 can be combined into a single network.

The border network 214 can forward packets between the compute service provider 210 and the co-location center 240 via the private network 250. The border network 214 can encompass multiple geographic areas. The border network 214 can communicate routing information with the client gateway 242 using a Border Gateway Protocol (BGP), such as internal BGP (iBGP). BGP is a TCP-based application layer protocol that is used to share routing information. Generally, iBGP peers are connected as a full mesh. However, when the border network 214 encompasses multiple geographic areas, a full mesh can potentially cause scalability issues. However, the border network 214 can include route reflectors to potentially increase the scalability of the border network 214. A route reflector (e.g., a network device such as an iBGP router) can advertise or reflect any routes it learned from one BGP router to other BGP peers within an autonomous system (AS). The border network 214 can be configured as a single AS. The route reflectors can be organized hierarchically in tiers so that route reflectors perform mutual reflection, where route reflectors can reflect routes for other route reflectors. As one example, a first tier of route reflectors can be located within a continental geographic area and the second tier of route reflectors can be located within a regional geographic area that is within the continental geographic area. In one embodiment, the border network 214 can forward packets using the multiprotocol label switching (MPLS) protocol. MPLS is a protocol having characteristics of the data link layer (OSI layer 2) and the network layer (OSI layer 3). Data packets transiting the MPLS network can be encapsulated with a label that can be used to route the packets. For example, a label can be assigned for a given customer, a given geographic region, a given configurable network, and/or other identifying information associated with the packet. As a specific example, customer traffic can be segregated in different respective L3-VPNs, where each L3-VPN has its own VRF instance. The private gateways 222 and the client gateway 242 can perform encapsulation and de-encapsulation of network packets at the boundaries of the MPLS network.

The client gateway 242 can be assigned to a particular customer. As one example, the client gateway 242 can be a logical device within a physical network device, such as a router supporting L3-VPN functionality. Thus, a single physical network device can support multiple logical gateways for different customers. The client gateway 242 can be used to control access between the client private network 230 and the border network 214. Specifically, the client gateway 242 can restrict the packets crossing the client gateway 242 so that only authorized packets can be transmitted among the client private network 230 and the configurable networks 220 associated with the client private network 230. The client gateway 222 can strip or de-encapsulate MPLS headers from packets that ingress from the border network 214 and add an 802.1Q header with a tag associated with the client private network 230. Similarly, the client gateway 222 can add or encapsulate MPLS headers to packets that egress to the border network 214. Packets can be forwarded from the client gateway 242 to the client private network 230 via the private network 260. In this manner, the client gateway 242 can be used to connect multiple customer sites to multiple configurable networks 220, where the different configurable networks 220 can be distributed in different geographic regions.

A customer using the client private network 230 can communicate with the compute service provider 210 via the client gateway 242 and/or using the public network 270. For example, the compute service provider 210 can include a public service endpoint 216 for providing access to the network manager 212 and to other miscellaneous services 218. Thus, a customer can configure the configurable networks 220 and the client gateway 242 using the network manager 212 that is accessed via the public service endpoint 216. For example, the customer can interact with the network manager 212 using a network service that is accessible via the public service endpoint 216. As another example, the customer can send API requests to the network manager 212 and receive API responses via the public service endpoint 216. The other miscellaneous services 218 can include services for provisioning and/or managing compute resources of the compute service provider 210. For example, the miscellaneous services 218 can include services for instantiating a compute resource (e.g., a virtual machine instance, a storage instance, and so forth) that connects with the configurable network 220.

The network manager 212 can be used to configure the configurable networks 220, to configure the client gateway 242, and/or to associate the configurable networks 220 with the client gateway 242. For example, the customer can specify ranges of network addresses that are used within a given configurable network 220 and ranges of network addresses that are shareable via the client gateway 242. The network manager 212 can analyze the customer specifications to generate configuration information that can be applied to the network devices of the private gateways 222 and the client gateway 242. For example, the configuration information can include an identification of routers and other network devices to be used in the path between the configurable networks 220 and the client private network 230, information representative of VRF instances for one or more routers supporting L3-VPN, the tags associated with an 802.1Q header for a given configurable network 220 or client private network 230, an MPLS tag associated with a given customer, and other information for routing packets between the configurable networks 220 and the client private network 230.

FIG. 3 is a computing system diagram of a network-based compute service provider 300 that illustrates one environment in which embodiments described herein can be used. By way of background, the compute service provider 300 (i.e., the cloud provider) is capable of delivery of computing, networking, and storage capacity as a service to a community of end recipients. In an example embodiment, the compute service provider can be established for an organization by or on behalf of the organization. That is, the compute service provider 300 may offer a "private cloud environment." In another embodiment, the compute service provider 300 supports a multi-tenant environment, wherein a plurality of customers operate independently (i.e., a public cloud environment). Generally speaking, the compute service provider 300 can provide the following models: Infrastructure as a Service ("IaaS"), Platform as a Service ("PaaS"), and/or Software as a Service ("SaaS"). Other models can be provided. For the IaaS model, the compute service provider 300 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. Additionally, application developers can develop and run their hardware solutions on configurable hardware of the compute service provider platform. The SaaS model allows installation and operation of application software in the compute service provider. In some embodiments, end users access the compute service provider 300 using networked client devices, such as desktop computers, laptops, tablets, smartphones, etc. running web browsers or other lightweight client applications. Those skilled in the art will recognize that the compute service provider 300 can be described as a "cloud" environment.

The particular illustrated compute service provider 300 includes a plurality of server computers 302A-302D. While only four server computers are shown, any number can be used, and large centers can include thousands of server computers. The server computers 302A-302D can provide computing resources for executing software instances 306A-306D. In one embodiment, the software instances 306A-306D are virtual machines. As known in the art, a virtual machine is an instance of a software implementation of a machine (i.e., a computer) that executes applications like a physical machine. In the example of a virtual machine, each of the servers 302A-302D can be configured to execute a hypervisor 308 or another type of program configured to enable the execution of multiple software instances 306 on a single server. Additionally, each of the software instances 306 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 320 can be reserved for executing software components for managing the operation of the server computers 302 and the software instances 306. For example, the server computer 320 can execute a management component 322. A customer can access the management component 322 to configure various aspects of the operation of the software instances 306 purchased by the customer. For example, the customer can purchase, rent or lease instances and make changes to the configuration of the software instances. The configuration information for each of the software instances can be stored as a machine image (MI) that describes the information used to launch a VM instance. The MI can include a template for a root volume of the instance (e.g., an OS and applications), launch permissions for controlling which customer accounts can use the MI, and a block device mapping which specifies volumes to attach to the instance when the instance is launched.

The customer can also specify settings regarding how the purchased instances are to be scaled in response to demand. The management component can further include a policy document to implement customer policies. An auto scaling component 324 can scale the instances 306 based upon rules defined by the customer. In one embodiment, the auto scaling component 324 allows a customer to specify scale-up rules for use in determining when new instances should be instantiated and scale-down rules for use in determining when existing instances should be terminated. The auto scaling component 324 can consist of a number of subcomponents executing on different server computers 302 or other computing devices. The auto scaling component 324 can monitor available computing resources over an internal management network and modify resources available based on need.

A deployment component 326 can be used to assist customers in the deployment of new instances 306 of computing resources. The deployment component can have access to account information associated with the instances, such as who is the owner of the account, credit card information, country of the owner, etc. The deployment component 326 can receive a configuration from a customer that includes data describing how new instances 306 should be configured. For example, the configuration can specify one or more applications to be installed in new instances 306, provide scripts and/or other types of code to be executed for configuring new instances 306, provide cache logic specifying how an application cache should be prepared, and other types of information. The deployment component 326 can utilize the customer-provided configuration and cache logic to configure, prime, and launch new instances 306. The configuration, cache logic, and other information may be specified by a customer using the management component 322 or by providing this information directly to the deployment component 326. The instance manager can be considered part of the deployment component.

Customer account information 328 can include any desired information associated with a customer of the multi-tenant environment. For example, the customer account information can include a unique identifier for a customer, a customer geographic address or addresses, a customer network address or addresses, billing information, licensing information, customization parameters for launching instances, customization parameters for configuring the configurable network 330 and/or the private gateway 360, scheduling information, auto-scaling parameters, previous IP addresses used to access the account, a listing of the MIs accessible to the customer, etc.

The configurable network 330 can be utilized to interconnect the server computers 302A-302D, the server computer 320, and the network manager 350. The configurable network 330 can be a local area network (LAN), where nodes (e.g., the server computers 302A-302D) assigned to a given customer are addressed using a VLAN tag assigned to the given customer. Thus, communication between nodes assigned to the customer can occur using VLAN-tagged packets associated with the customer. Packets of other customers may transit the LAN, but those packets can be segregated from the given customer's nodes because they do not have a matching VLAN tag. Thus, the traffic of a given customer can be isolated from the traffic of other customers while using the same underlying physical hardware (e.g., network devices). The configurable network 330 can be connected to a Wide Area Network (WAN) 340 so that end users can access other services and resources of the compute service provider 300. In one embodiment, the wide-area network 340 is contained within a geographic region of the compute service provider 300. The configurable network 330 can be connected to a private gateway 360, which can provide a connection to a border network 370. The border network 370 can link local resources of the compute service provider 300 to remote resources (e.g., resources at a different geographic site) of the compute service provider 300. The private gateway 360 can be reserved for a single customer and/or can be partitioned among multiple customers. For example, the private gateway 360 can support multiple virtual private gateways, where a given virtual private gateway is allocated for a single user or customer. It should be appreciated that the network topology illustrated in FIG. 3 has been simplified and that many more networks and networking devices can be utilized to interconnect the various computing systems disclosed herein.

The network manager 350 can be used to configure the configurable network 330, the private gateway 360, and a gateway (not shown) located at a co-location center. The network manager 350 can be software, hardware, or combination thereof. For example, the network manager 350 can be a software service executing on a fleet of server computer hosts. Generally, the network manager 350 can be used to configure a logical gateway connecting the configurable network 330 to other configurable networks of the compute service provider 300 and/or to a network located a customer site. The network manager 350 can generate routing information for the logical gateway that connects the configurable network 330 to other networks. The routing information restricts the network addresses that are shareable among the networks to non-overlapping network address spaces. The network manager 350 can use the generated routing information configure the logical gateway.

FIG. 4 illustrates an example system 400 including a configured private gateway 410 for providing a communication path between multiple configurable networks (420, 430, and 440) and multiple client private networks (450 and 460). As one example, the client private networks 450 and 460 and the logical private gateway 410 can be controlled by and associated with a user having an account A. The configurable networks 420, 430, and 440 can be controlled by and associated with different users having respective accounts B, C, and D. For example, account A can be associated with an IT department of an organization and accounts B, C, and D can be associated with other departments of the organization. As illustrated, each of the configurable networks 420, 430, and 440 can be contained within a single geographic region and the different configurable networks 420, 430, and 440 are located in different respective geographic regions. However, a single configurable network can include network devices across multiple geographic regions, and there can be multiple configurable networks located within the same geographic region. The client private networks 450 and 460 can be connected to the different configurable networks 420, 430, and 440 using the logical private gateway 410. It should be appreciated that while two client private networks and three configurable networks are shown, more or fewer of the respective networks can be present in a given system.

The logical private gateway 410 can be implemented on a physical infrastructure encompassing multiple network devices and network architectures. For example, the logical private gateway 410 can include a client gateway, a border gateway, and private gateways (such as the private gateways 222, the client gateway 242, and the border network 214 of FIG. 2). As one example, network packets can be routed between a local network and its corresponding interface of the logical private gateway 410 using VLAN tagged packets, where the tag can be assigned based on a user or account owner associated with the local network and/or an identifier for the logical private gateway 410. As illustrated, interface 452 corresponds to the client private network 450, interface 462 corresponds to the client private network 460, interface 422 corresponds to the configurable network 420, interface 432 corresponds to the configurable network 430, and interface 442 corresponds to the configurable network 440. Ingress packets at one of the interfaces from one of the local networks can be forwarded across the logical private gateway 410 to an egress interface using the MPLS protocol, for example. As a specific example, ingress packets at the interface 452 from the client private network 450 can be forwarded across the logical private gateway to an egress interface 422, 432, or 442. The interfaces of the logical private gateway 410 can be used to strip the VLAN header from packets that ingress from the local network and to add an MPLS header for packets transiting the logical private gateway 410. The interfaces of the logical private gateway 410 can also be used to strip the MPLS header and add a VLAN header for packets that egress to the local network.

A network manager (not shown) can be used to configure the logical private gateway 410 so that network traffic can be passed between the client private networks 450 and 460 and the configurable networks 420, 430, and 440. The configuration information for the logical private gateway 410 can be generated based on inputs from users of the logical private gateway 410 and/or from rules and policies of a compute service provider. For example, a given user can request that a range of network addresses can be allocated for a given local network. The network manager can determine whether the range of the network addresses are nonoverlapping with other network addresses that are accessible via the logical private gateway 410. If the addresses are nonoverlapping, the network manager can release the range of network addresses to be used in the local network. A given user can specify that a range of network addresses within the local network are to be shared with networks that are connected to the logical private gateway 410. The network manager can determine whether the range of network addresses are nonoverlapping with other network addresses accessible via the logical private gateway 410, and the network manager can generate configuration data to program the interfaces of the logical private gateway 410 so that the network addresses can be shared when the addresses are nonoverlapping. As a specific example, a virtual routing and forwarding (VRF) instance can be associated with each interface, and the VRF instances can include a routing table providing a full or partial path to the shareable addresses. The generated configuration data can be optimized by performing an LPM calculation so that redundant routing table entries can be eliminated. As one example, a single routing table entry can be generated that merges an entry for a longer prefix into an entry for a shorter prefix. Generally, the routing table entries can be modified (e.g., filtered) and/or deleted to control the addresses of packets that can be shared via the logical private gateway 410. For example, the routing table entries can increase a size of a routing prefix or decrease a size of a routing prefix. The network manager can configure (e.g., program) the logical private gateway 410 using the configuration data that is generated. For example, the network manager can update programmable state of the network devices, such as VRF instances. The network manager can initiate information exchange among the network devices, such as by causing a BGP update packet to be sent from one network device to another network device. BGP can support extended communities which enable a route target and/or a route distinguisher to be identified. The interfaces belonging to a logical private gateway 410 can be specified using one or more route targets and/or route distinguishers for the interfaces. As illustrated, the logical private gateway 410 is identified using the route target 123456:9; the interface 422 corresponding to the configurable network 420 also includes a route target 987654:1; the interface 432 corresponding to the configurable network 430 also includes a route target 987654:2; the interface 442 corresponding to the configurable network 440 also includes a route target 987654:3.

FIG. 5 illustrates an example of a logical model 500 for allocating resources among a group of local networks, such as the configurable networks 510A-B and the client private network 560. The local networks can be controlled by different users and can include private network space that can be updated without coordination between the different users. As one example, the configurable networks 510A-B can be configurable resources that are provided by a compute service provider. The client private network 560 can be located at a customer site that is external to the compute service provider. The logical private gateway 540 can be controlled by one of the users, such as a user (e.g., the IT department) associated with the client private network 560. The local networks can connect to the logical private gateway 540 using private virtual interfaces. For example, the configurable network 510A can connect to the logical private gateway 540 using the interface 520A; the configurable network 510B can connect to the logical private gateway 540 using the interface 520B; and the client private network 560 can connect to the logical private gateway 540 using the interface 550. The private virtual interfaces 520A and 520B can be dedicated to their respective configurable networks 510A and 510B. The network space within the configurable networks 510A-B can default to private network space until an association (represented by gateway associations 530A and 530B) is made with the logical private gateway 540. For example, the CIDR blocks 10.71.0.0/16 and 10.72.0.0/16 can be associated with the private virtual interface 520A, indicating that these CIDR blocks are shareable with the client private network 560. As another example, the CIDR block 10.81.0.0/16 can be associated with the private virtual interface 520B, indicating that the CIDR block is shareable with the client private network 560. The network manager (not shown) can ensure that the CIDR blocks of the gateway associations 530A and 530B are nonoverlapping. For example, the network manager can reject a request to add a CIDR block that overlaps with a CIDR block that is already associated with a local network connected to the logical private gateway 540. Thus, the network manager can allocate mutually exclusive CIDR blocks to each of the local networks. In this manner, the users associated with the local networks can be empowered to have control over their network address space within the constraints enforced by the network manager. After a CIDR block is associated with the logical private gateway 540, the address range can be advertised to network devices of the logical private gateway 540 so that packets destined for the associated address ranges can be forwarded between the local networks.

Example Method for Configuring a Gateway Using a Network Manager

Figure 6:
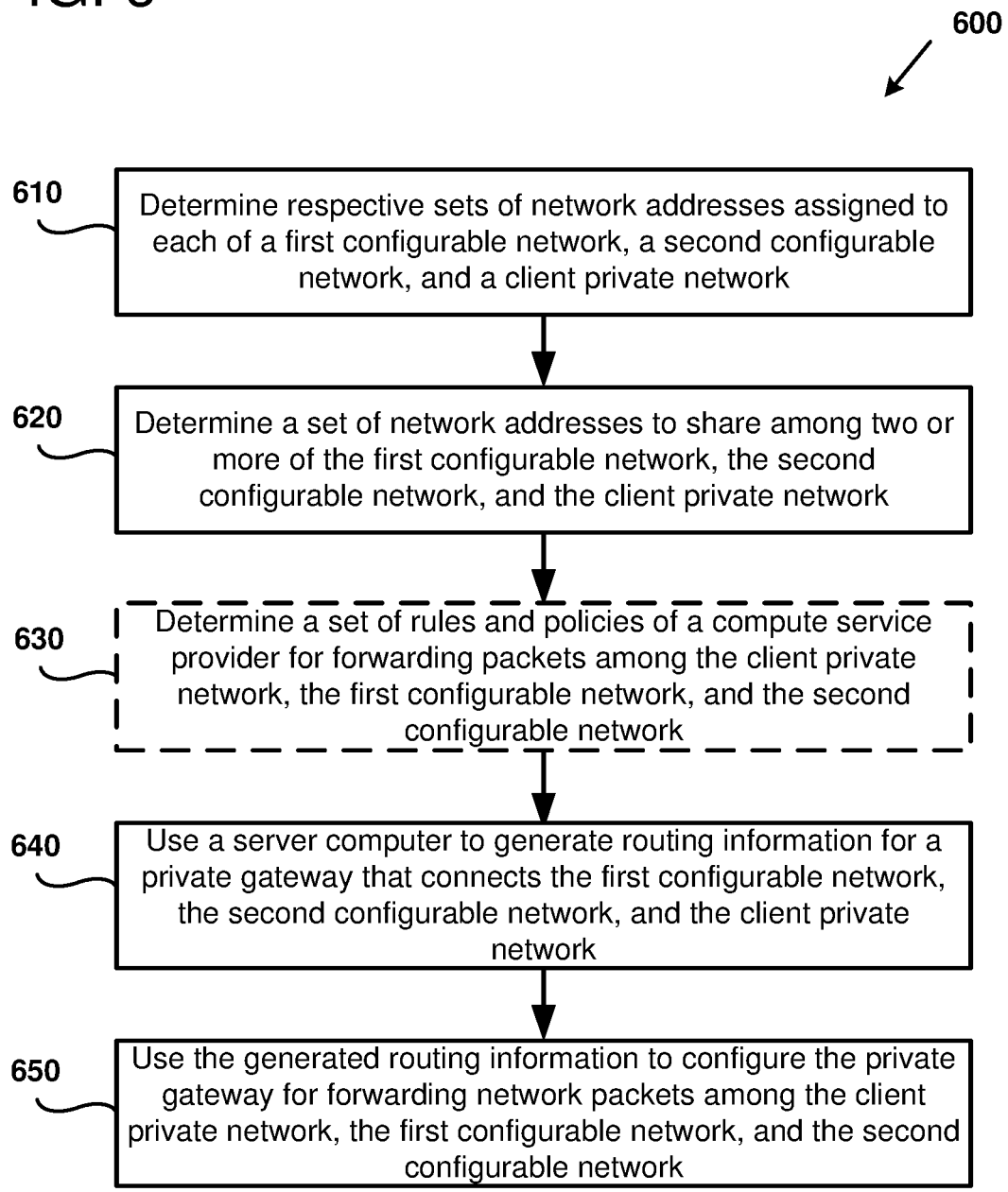
FIG. 6 is a flow diagram of an example method of configuring a private gateway.

FIG. 6 is a flow diagram of an example method 600 of configuring a gateway using a network manager. As one example, the method 600 can be implemented using software, hardware, or a combination thereof using an architecture as described above with reference to FIGS. 1-5. In particular, the method 600 can be implemented using a server computer executing network manager software.

At 610, respective sets of network addresses assigned to each of a first configurable network, a second configurable network, and a client private network can be determined. Specifically, a first set of network addresses assigned to the first configurable network can be determined; a second set of network addresses assigned to the second configurable network can be determined; and a third set of network addresses assigned to the client private network can be determined. As one example, the network addresses can be Internet Protocol addresses that are specified using CIDR block notation. The first configurable network and the second configurable network can be configurable networks of a compute service provider. The client private network can be a customer-premises network that is external to the compute service provider. For example, the client private network can be connected to compute service provider via a private gateway that includes one or more network devices residing at a co-location data center that may be provided by a communications provider. As one example, the set of network addresses can be determined by retrieving the set of network addresses from a database of the compute service provider and/or by receiving the set of network addresses from a client device of a customer of the compute service provider via an API or a console provided by the compute service provider.

At 620, a set of network addresses to share among two or more of the first configurable network, the second configurable network, and the client private network can be determined. As one example, the network addresses can be Internet Protocol addresses that are specified using CIDR block notation. The set of shareable network addresses can be provided by a client device that is authorized to have access to the private gateway configuration information. The set of shareable network addresses can be provided by a customer of the compute service provider via an API or a console provided by the compute service provider.

At 630, a set of rules and policies of a compute service provider can be provided. The rules and policies can specify how to forward packets among the client private network, the first configurable network, and the second configurable network. As one example, the rules and policies can include a rule to prevent the first configurable network and the second configurable network from exchanging network packets across the private gateway. The rules and policies can include a rule to prevent a client private network at a first geographic location and a client private network at a second different geographic location from exchanging network packets across the private gateway.

At 640, a server computer executing network manager software can be used to generate routing information for the private gateway that connects the first configurable network, the second configurable network, and the client private network. The routing information can restrict the network addresses that are reachable within a given network from outside of the given network. For example, the routing information can restrict the network addresses that are reachable within the first configurable network from the client private network to addresses that do not overlap with the respective sets of network addresses assigned to the second configurable network and the client private network. Similarly, the routing information can restrict the network addresses that are reachable within the second configurable network from the client private network to addresses that do not overlap with the respective sets of network addresses assigned to the first configurable network and the client private network; and the routing information can restrict the network addresses that are reachable within the client private network from the first and second configurable networks to addresses that do not overlap with the respective sets of network addresses assigned to the first and second configurable networks. The server computer can be external to the private gateway. As one example, the server computer can be incorporated within a fleet of server computers that are provisioned to execute network manager software. By using a server computer external to the private gateway for generating routing information for the private gateway, a processing load of the private gateway can be reduced and the system can be more scalable with higher availability.

Generating routing information for the private gateway can include generating respective virtual routing and forwarding (VRF) instances for interfaces of each of the client private network, the first configurable network, and the second configurable network. For example, the interfaces can be implemented on layer three virtual private network (L3-VPN) network devices that are part of the private gateway. Generating routing information for the private gateway can include assigning a BGP route target and/or route destination to a particular network and/or user. Generating routing information for the private gateway can include configuring the private gateway complies with the set of rules and policies of a compute service provider. Generating routing information for the private gateway can include assigning an MPLS tag to user of the private gateway so that customer data can be segregated by the compute service provider. Generating routing information for the private gateway can include optimizing or reducing the ranges of network addresses to be advertised to neighboring networks so that an LPM load on the network devices of the private gateway can be reduced. For example, shareable address ranges having longer prefix can be subsumed within shareable address ranges having shorter prefix when the address ranges are connected to a common interface of the private gateway. Thus, multiple address ranges can be combined within the VRF instances that are used to program the L3-VPN network devices.

At 650, the generated routing information can be used to configure the private gateway for forwarding network packets among the client private network, the first configurable network, and the second configurable network. For example, configuring the private gateway can include programming the L3-VPN network devices to forward packets from one interface of the private gateway to another interface of the private gateway, such as by programming the L3-VPN network devices to use the VRF instances. As another example, configuring the private gateway can include causing an internal or external BGP update frame to be exchanged between network devices of the private gateway.

Example Computing Environment

Figure 7:
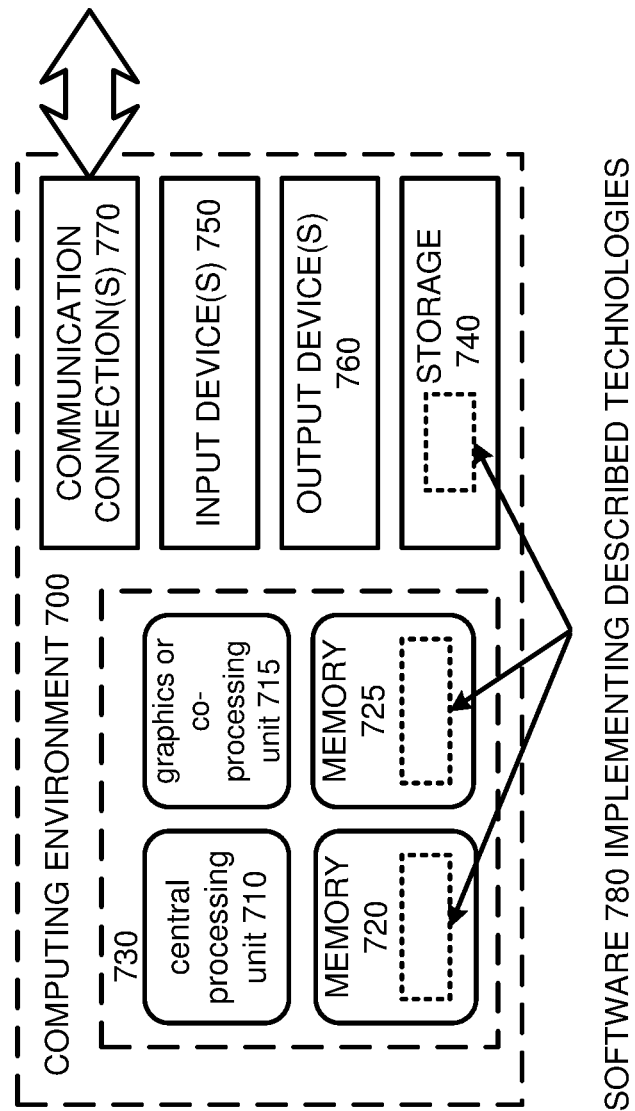
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), a processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We claim as our invention all that comes within the scope of these claims.

What is claimed is:

1. A system comprising:
   a first configurable network of a compute service provider programmed to use a first range of Internet Protocol addresses;
   a second configurable network of the compute service provider programmed to use a second range of Internet Protocol addresses;
   a private gateway connecting the compute service provider to a client private network, the private gateway comprising a layer three virtual private network (L3-VPN) network device; and
   a server computer executing a network manager module configured to:
      generate routing information for the private gateway, wherein the routing information restricts the Internet Protocol addresses that are reachable from the client private network to non-overlapping Internet Protocol address spaces within each of the first configurable network and the second configurable network; and
      use the generated routing information to configure the private gateway for forwarding network packets between the client private network and the first and second configurable networks.

2. The system of claim 1, wherein generating routing information for the private gateway comprises generating respective virtual routing and forwarding (VRF) instances for interfaces to each of the client private network, the first configurable network, and the second configurable network.

3. The system of claim 2, wherein the VRF instances are used to program state of the L3-VPN network device, and wherein network traffic of respective customers of the compute service provider is segregated using the L3-VPN network device.

4. The system of claim 1, wherein the first range of Internet Protocol addresses and the second range of Internet Protocol addresses comprise an overlapping address, and wherein the private gateway is configured to enable only one of the first and second configurable networks to forward packets having the overlapping address across the private gateway to the client private network.

5. The system of claim 1, wherein generating routing information for the private gateway comprises modifying the advertised routes of an interface by changing a routing prefix associated with a routing table entry.

6. The system of claim 1, wherein the network manager module is further configured to provide a console accessible at a uniform resource locator, and routing information for the private gateway is entered via an interface of the console.

7. A system comprising:
- a first configurable network programmed with a first set of network addresses;
- a second configurable network programmed with a second set of network addresses;
- a gateway connecting the first configurable network to a client private network and the second configurable network to the client private network; and
- one or more server computers configured to:
  - generate routing information for the gateway, wherein the routing information restricts the network addresses within the first and second configurable networks that are reachable from the client private network to non-overlapping network address spaces within each of the first configurable network and the second configurable network; and
  - use the generated routing information to configure the gateway for forwarding network packets between the client private network and the first configurable network and between the client private network and the second configurable network.

8. The system of claim 7, wherein generating routing information for the gateway comprises generating respective virtual routing and forwarding instances for interfaces of each of the client private network, the first configurable network, and the second configurable network.

9. The system of claim 7, wherein configuring the gateway comprises programming layer three virtual private network (L3-VPN) network devices to forward packets from one interface of the gateway to another interface of the gateway.

10. The system of claim 9, wherein a first L3-VPN network device is configured to send packets from the first configurable network using a first Border Gateway Protocol (BGP) route distinguisher assigned to the first configurable network and to send packets from the second configurable network using a second BGP route distinguisher assigned to the second configurable network.

11. The system of claim 7, wherein the gateway comprises a border network that forwards packets between the first configurable network and the client private network using a multiprotocol label switching protocol.

12. The system of claim 7, wherein generating routing information for the gateway comprises reducing a number of the advertised routes of an interface by filtering or merging a routing table entry for a longer prefix into a routing table entry for a shorter prefix.

13. The system of claim 7, wherein the one or more server computers are further configured to provide a console accessible at a network address, and wherein routing information for the gateway is entered via an interface of the console.

14. The system of claim 7, wherein the first set of network addresses and the second set of network addresses comprise a first overlapping address, and wherein the gateway is configured to enable only one of the configurable networks to forward packets from the first overlapping address across the gateway and to the client private network.

15. A method comprising:
- determining respective sets of network addresses assigned to each of a first configurable network, a second configurable network, and a client private network;
- determining a set of network addresses to share among two or more of the first configurable network, the second configurable network, and the client private network;
- using one or more server computers to generate routing information for a network gateway that connects the first configurable network, the second configurable network, and the client private network, wherein the routing information restricts the network addresses that are reachable within the first configurable network from outside of the first configurable network to addresses that do not overlap with the respective sets of network addresses assigned to the second configurable network and the client private network, the one or more server computers being external to the network gateway; and
- using the generated routing information to configure the network gateway for forwarding network packets among the client private network, the first configurable network, and the second configurable network.

16. The method of claim 15, further comprising:
- determining a set of rules and policies of a compute service provider for forwarding packets among the client private network, the first configurable network, and the second configurable network, and wherein the generated routing information complies with the set of rules and policies of the compute service provider.

17. The method of claim 16, wherein the rules and policies of the compute service provider for routing packets include preventing the first configurable network and the second configurable network from exchanging network packets with each other.

18. The method of claim 15, wherein generating routing information for the network gateway comprises generating respective virtual routing and forwarding instances for interfaces of each of the client private network, the first configurable network, and the second configurable network.

19. The method of claim 15, wherein configuring the network gateway comprises programming a layer three virtual private network (L3-VPN) network device to forward packets from one interface of the network gateway to another interface of the network gateway.

20. The method of claim 19, wherein the L3-VPN network device is configured to send packets to the first configurable network using a first Border Gateway Protocol (BGP) route target assigned to the first configurable network and to send packets to the second configurable network using a second BGP route target assigned to the second configurable network.

* * * * *